Patented Aug. 4, 1925.

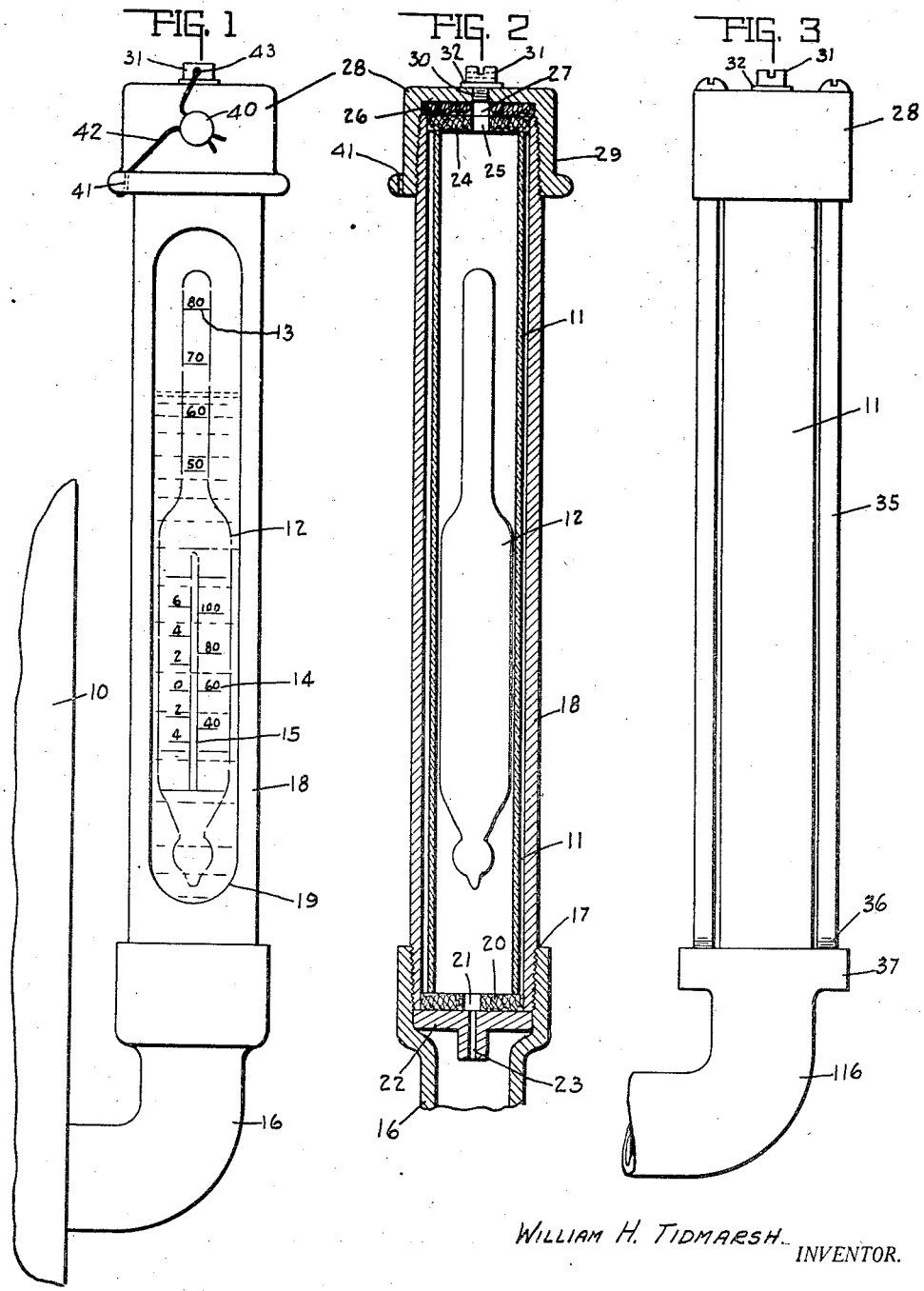

1,548,290

UNITED STATES PATENT OFFICE.

WILLIAM H. TIDMARSH, OF ELWOOD, INDIANA.

VACUUM-CONTROL SPECIFIC-GRAVITY GAUGE.

Application filed April 29, 1920. Serial No. 377,617.

*To all whom it may concern:*

Be it known that I, WILLIAM H. TIDMARSH, a citizen of the United States, and a resident of Elwood, county of Madison, and State of Indiana, have invented a certain new and useful Vacuum-Control Specific-Gravity Gauge; and I do hereby declare that the following is a full, clear, and exact description thereof, reference being had to the accompanying drawings, in which like numerals refer to like parts.

This invention relates to gauges and the like for indicating the specific gravity of liquids, and more particularly hydrocarbon fuels, such as gasoline, when contained within suitable tanks, retainers or pump mechanisms or dispensed therefrom.

The chief object of this invention is to connect the improved gauge to the pump, tank or retainer in such a manner that no valve means is interposed between the containing means and the gauge, whereby a purchaser of the hydrocarbon fuel is assured that the gauge will register the correct specific gravity of the fuel vended from said pump, tank or retainer.

The chief feature of the invention consists in providing the gauge with means whereby the flow of fuel between said gauge and said containing means is controlled by the vacuum formed within the gauge.

Another feature of the invention consists in constructing the gauge of but few parts, and these of simple and standard construction.

A further feature of the invention consists in providing suitable seal means associated with the vacuum controlling means, whereby any tampering with the same will destroy the seal means.

Another feature of the invention consists in providing the vacuum control gauge with compressible closure members whereby the level of the fluid of the gauge tube is movable when the pressure changes.

Another feature of the invention consists in applying the gauge to a pump including a foot valve and said gauge, when so associated, will register any leakage of the foot value when pressure is applied to the gauge.

The full nature of the invention will be understood from the accompanying drawings and the following description and claims.

In the drawings Fig. 1 is a side elevational view of the preferred form of the invention. Fig. 2 is a central sectional view of the same. Fig. 3 is a side elevational view of a modified form of the invention.

In the drawings 10 indicates the containing means such as a pump, tank, a crude oil pipe line, crank case, or retainer adapted to contain hydrocarbon fuels, lubricating oils and the like. In the preferred form the gauge consists of a suitable transparent tubular chamber forming member 11 preferably formed of gauge glass. Positioned within the gauge glass 11 is the usual standard hydrometer 12 or other suitable specific gravity indicating float means. In the present instance the hydrometer is provided with the usual specific gravity scale 13, temperature scale 14 and the thermometer 15, whereby the correct specific gravity of a liquid within the gauge glass or tube 11 may be ascertained.

Means for connecting the gauge to the containing means 10 comprises in the present instance a standard reducing street elbow 16 providing the base of the gauge. The base 16 is interiorly threaded at 17 and is adapted to receive an elongated protecting and enclosing tubular housing or casing member, such as a pipe 18, said pipe being provided with a plurality of elongated openings or slots 19 through which the hydrometer or other specific gravity indicating device or float is visible, so that the specific gravity or liquid level reading can be observed simultaneously from a plurality of directions. Positioned at the base of the gauge glass or tube 11 is a suitable compressible packing washer 20, said washer being provided with an opening 21 communicating with said tube. Adjacent the packing washer 20 is a valve member 22, said valve member being seatable in said base 16 and being provided with a restricted opening or orifice 23, the same registering with the opening 21 in the packing 20, whereby the tube 11 is in free communication with the containing means 10.

Upon the upper end of the tubular member 11 is positioned a compressible packing washer 24, said washer being provided with a suitable opening 25 therethrough. Adjacent said washer 24 is a second compressible washer 26 provided with a similar opening 27 registering with the opening 25. A cap member 28 is provided with a threaded engagement 29, whereby the same is secured to and upon the slotted, enclosing and protecting tube 18. The cap member 28 is provided with a vent opening 30, said vent registering with the registering openings 25 and 27 and being suitably threaded and adapted to receive a vent controlling plug member 31. Between the head of the plug 31 and the cap 28 is a suitable packing washer 32.

The construction hereinbefore described is secured in assembled relation by the valve member 22 being seated in the base 16 and rigidly secured therein by means of the tube 18 being threaded into the base 16. Within the concentric enclosing and protecting tube 18, adjacent the valve member 22 and beneath the tubular gauge member 11 is positioned the compressible packing washer 20, whereby an air tight joint is secured between said washer, valve member and tubular member 11. Similarly upon the upper end the compressible packing washer 24 is positioned upon the end of the tubular member 11. Within the enclosing and protecting tube 18 and adjacent said washer 24 is positioned the additional compressible packing washer 26, said washers forming an air tight connection between the tube 11 and the cap 28 when said cap is threaded down and upon the tubular member 18. If desired suitable sealing material may be supplied between the adjacent ends of the glass 11 and tube 18.

With the gauge connected and constructed as shown, liquid is admitted in the tube 11 from the container 10 through the restricted opening or orifice 23 and the opening 21. The level of said liquid rises in said tube 11 until the air discharged from the tube is stopped by the vent controlling plug 31 being screwed into the vent 30 in the cap member 28. Thus, the level of the liquid in the gauge can be automatically adjusted to the hydrometer and the same will be maintained within the tube 11 by the creation of a partial vacuum in said tube, due to the liquid attempting to escape from the tube and return to the containing means 10 through the restricted opening 23. The hydrometer 12, thus, may be positioned with respect to the openings 19 in the enclosing and protecting pipe 18, so that the specific gravity reading and temperature reading, as well as the liquid level reading will be visible through said gauge glass 11 and the opening 19.

With the foregoing construction the level of the liquid in the tube 11 can be regulated at will, by means of the vacuum control hereinbefore described. Furthermore, the purchaser of the liquid, and in particular gasoline, can always be assured that the liquid contained within the tube 11 is identical with that vended from the containing means 10, since there is a free communication between the tube 11 and the containing means 10. Furthermore, when the gauge is associated with a pressure pump, the variations in pressure are transmitted to the liquid in the glass 11 and since the washers or equivalent means are slightly compressible, the liquid level will vary with the pressure which also carries with it the hydrometer or equivalent specific gravity indicating means so as to indicate that the pump and gauge are operatively connected. This liquid level movement does not affect the specific gravity reading. Any attempt to change the liquid in the tube 11 to increase the specific gravity reading by introducing a higher specific gravity liquid into said tube, is prevented, since any tampering with the vent controlling plug 31 releases the vacuum valve control, and permits the liquid contained within the tube 11 to immediately return to the containing means 10, or if attached to a pressure retainer, the liquid will escape through the vent 30.

In Fig. 3 a modified form of the invention is disclosed, wherein the tube 18 is dispensed with and the same is replaced by suitable connecting or tension rod members 35, said rod members in the present instance extending through the cap member 28 and having a threaded end 36 engageable with suitable lug means or ears 37 formed upon the base member 116. The rod members 35 are adjusted longitudinally of the tube 11, so that air tight joints are secured between said tube and the base 116 and the cap member 28 respectively.

As shown in Figs. 1 and 2, suitable seal means 40 is provided, the cap 28 being suitably perforated as at 41 to receive a sealing wire 42 and the vent plug 31 is perforated at 43 to receive the wire 42, the free ends thereof being secured together by the seal 40. Thus, any tampering with the vent controlling plug 31 will destroy the seal 40.

When the invention is associated with a pump including a foot valve and said foot valve leaks, it will be understood that when the pressure in the pump balances that in the gauge, and when due to leakage said pressure balance is disturbed, the liquid in the gauge will immediately leave the tube and pass into the container or pump.

While the invention has been described in great detail and one modification of the preferred form has been illustrated, it will be understood that other modifications will readily suggest themselves to those skilled in the art, and the same are considered to be within the broad purview of the invention, the generic idea of which consists in providing a valveless or vacuum control upon a visible gauge for liquid containers and the like, whereby the possibility of fraud in the vending of gasoline and the like is prevented.

The invention claimed is:

1. A vacuum controlled visible gauge for liquid containers and the like, comprising a chamber in communication with the container, float means in said chamber and visible from without the same, vacuum controlling means associated with said chamber for regulating the flow of liquid between the container and the chamber, and seal means associated with said vacuum controlling means.

2. A vacuum controlled visible gauge for liquid containers and the like, comprising a chamber in communication with the container, float means in said chamber, and compressible means associated with said chamber other than the air trapped therein for permitting the pressure variations applied to the liquid to be indicated without the container through said float means.

3. A vacuum controlled visible gauge for liquid containers and the like, comprising a chamber in communication with the container, means provided with a restricted opening between said container and said chamber, float means in the latter, and compressible means associated with said chamber other than the air trapped therein whereby the liquid level indicates the pressure variations applied thereto.

4. A vacuum controlled visible gauge for liquid containers and the like, comprising a chamber in communication with the container, float means in said chamber and visible from without the same, and compressible means associated with said chamber other than the air trapped therein whereby pressure variations applied to the liquid will be indicated.

5. A visible gauge for liquid containers and the like, comprising a chamber in communication with the container, float means in said chamber and visible from without the same, controlling means associated with said chamber for regulating the flow of liquid between the container and the chamber, and seal means associated with said controlling means.

6. A visible gauge for liquid containers and the like, comprising tubular means having but one and its lower end in valveless communication with the container, means providing a restricted passage between the container and said tubular means, float means in said tubular means, means closing the other end of the tubular means including an air vent, and means closing said vent after a predetermined amount of liquid is received by the tubular means from the container and is maintained within said tubular means.

7. A visible gauge for liquid pressure dispensing containers and the like, comprising a chamber having a single valveless connection with the pressure dispenser, means providing a restricted passage between said dispenser and said chamber, and means for maintaining a partial vacuum within said chamber for maintaining the liquid trapped in said chamber therein independently of the dispensing operations but permitting the escape of the trapped liquid when the pressure dispenser varies from its operative condition.

In witness whereof, I have hereunto affixed my signature.

WILLIAM H. TIDMARSH.